United States Patent
Zhai (10) Patent No.: US 7,782,906 B2
(45) Date of Patent: Aug. 24, 2010

(54) METHOD FOR CARRYING FRAME RELAY OVER ETHERNET

(75) Inventor: Suping Zhai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 12/163,630

(22) Filed: Jun. 27, 2008

(65) Prior Publication Data

US 2008/0259959 A1  Oct. 23, 2008

Related U.S. Application Data

(63) Continuation of application No. PCT/CN2006/002277, filed on Sep. 4, 2006.

(30) Foreign Application Priority Data

Dec. 30, 2005 (CN) .................. 2005 1 0097146

(51) Int. Cl.
*H04J 3/24* (2006.01)
(52) U.S. Cl. .................. 370/474; 370/395.53; 370/389; 370/392; 370/401; 370/466; 370/469
(58) Field of Classification Search .................. 370/235, 370/246, 389, 395.52, 395.53, 395.6, 392, 370/394, 401, 463–472, 492, 501, 545; 455/13.1; 709/218, 224, 230, 249; 714/713; 725/148, 725/149
See application file for complete search history.

(56) References Cited

U.S. PATENT DOCUMENTS 7,065,077 B1 * 6/2006 Radhakrishnan et al. .... 370/389

7,218,647 B2 * 5/2007 Ozguner ................. 370/471

(Continued)

FOREIGN PATENT DOCUMENTS

CN 1697418 A 11/2005

OTHER PUBLICATIONS

Sonia D. Bot; "Key Technical Considerations When Using Ethernet Solutions in Existing ATM and Frame Relay Networks"; IEEE Communications Magazine; Mar. 2004; pp. 96-102.*

(Continued)

*Primary Examiner*—Pankaj Kumar
*Assistant Examiner*—Mark A Mais
(74) *Attorney, Agent, or Firm*—Leydig, Voit & Mayer, Ltd.

(57) ABSTRACT

A method for carrying Frame Relay over Ethernet comprises: receiving a Frame Relay frame, and removing header and tail flag sequences from the Frame Relay frame; determining a control word and performing payload encapsulation; mapping a DLCI to a VCE ID and encapsulating the VCE ID; encapsulating an Ethernet frame header, generating an Ethernet FCS and transmitting the Ethernet frame to Ethernet; and, receiving the Ethernet frame, checking the Ethernet frame and removing the Ethernet frame header; removing the VCE ID, and mapping the VCE ID to the DLCI; obtaining the control word, obtaining Frame Relay information from the payload and reconstructing the Frame Relay frame according to the control word; adding flag sequences to the Frame Relay frame, and transmitting the Frame Relay frame to a Frame Relay network. According to the invention, Frame Relay carried over Ethernet may be implemented without relying on the types of the upper layer protocols.

15 Claims, 6 Drawing Sheets

U.S. PATENT DOCUMENTS

| | | | | |
|---|---|---|---|---|
| 7,333,508 | B2* | 2/2008 | Rabie et al. | 370/466 |
| 7,386,010 | B2* | 6/2008 | Solomon et al. | 370/466 |
| 7,417,995 | B2* | 8/2008 | Rabie et al. | 370/401 |
| 7,467,215 | B2* | 12/2008 | Ould-Brahim | 709/230 |
| 7,565,436 | B2* | 7/2009 | Rabie et al. | 709/229 |
| 2005/0147104 | A1 | 7/2005 | Ould-Brahim | |
| 2005/0165961 | A1 | 7/2005 | Unbehagen et al. | |
| 2006/0209886 | A1* | 9/2006 | Silberman et al. | 370/466 |
| 2006/0251067 | A1* | 11/2006 | DeSanti et al. | 370/389 |
| 2007/0081454 | A1* | 4/2007 | Bergamasco et al. | 370/229 |

OTHER PUBLICATIONS

Grossman et al.; "Multiprotocol Encapsulation over ATM Adaption Layer 5" (RFC 2684); Sep. 1999; pp. 1-18.*

Xiao et al. "Requirements for Pseudo-Wire Emulation Edge-to-Edge (PWE3)" (RFC 3916); Sep. 2004; pp. 1-20.*

Bryant et al.; "A Proposed Frame Relay Encapsulation for PWE3"; Mar. 2002; pp. 1-13.*

Martini et al.; "Encapsulation Methods for Transport of Frame Relay Over MPLS Networks" (Internet Draft); Jun. 2005, pp. 1-19.*

Martini et al., "Encapsulation Methods for Transport of Frame Relay Over MPLS Networks," *IETF Standard Working Draft*, pwe(6): 1-19 (Jun. 2005) draft-ietf-pwe3-frame-relay-06.txt.

* cited by examiner

| F | Address | Information | FCS | F |

Fig. 1

| 0 | 1 | 2 | 3 | 4 | 5 | 6 | 7 |
|---|---|---|---|---|---|---|---|
| EA(0) | C/R | \multicolumn{6}{c}{Higher DLCI} |
| EA(1) | DE | BECN | FECN | \multicolumn{4}{c}{Lower DLCI} |

Fig. 2

| 0 | 1 | 2 | 3 | 4 | 5 | 6 | 7 |
|---|---|---|---|---|---|---|---|
| EA(0) | C/R | Higher DLCI | | | | | |
| EA(0) | DE | BECN | FECN | DLCI | | | |
| EA(0) | DLCI | | | | | | |
| EA(1) | D/C | Lower DLCI or DL-CORE control | | | | | |

| 6 bytes | 6 bytes | 2 bytes | N bytes | 4 bytes |
|---|---|---|---|---|
| DA | SA | LEN/TYPE | Payload | FCS |

802.1q

| 6 bytes | 6 bytes | 4 bytes | 2 bytes | N bytes | 4 bytes |
|---|---|---|---|---|---|
| DA | SA | C-TAG | LEN/TYPE | Payload | FCS |

802.1ah

| 6 bytes | 6 bytes | 4 bytes | 6 bytes | N bytes | 4 bytes |
|---|---|---|---|---|---|
| DA | SA | S-TAG | I-TAG | Payload | FCS |

| 802.1ah | | | | | | |
|---|---|---|---|---|---|---|
| 6 bytes | 6 bytes | 4 bytes | 6 bytes || N bytes | 4 bytes |
| | | | I-TAG || | |
| DA | SA | S-TAG | TPID, etc (3 bytes) | I-SID, i.e., VCE ID (3 bytes) | Payload | FCS |

Fig. 9(4)

| 0 | 3 | 4 | 5 | 7 | 8 | 9 | 10 | 15 | 16 | 31 |
|---|---|---|---|---|---|---|---|---|---|---|
| 0 0 0 0 | | M | 0 0 0 | | FRG | | LEN | | SN | |

Fig. 10

METHOD FOR CARRYING FRAME RELAY OVER ETHERNET

CROSS-REFERENCE TO RELATED APPLICATIONS

This application is a continuation of International Patent Application No. PCT/CN2006/002277, filed Sep. 4, 2006, which claims priority to Chinese Patent Application No. 200510097146.3, filed Dec. 30, 2005, both of which are hereby incorporated by reference in their entirety.

FIELD OF THE INVENTION

The invention relates to network interworking techniques, and more particularly, to a method for carrying Frame Relay over Ethernet.

BACKGROUND

With continuing progress in Ethernet techniques, operators can provide various services by using Ethernet techniques directly within Metropolitan Area Network (MAN). In the meantime, triple play services also drive Ethernet to evolve into carrier Ethernet with higher reliability. During this process, a problem arises as how Ethernet interworks with other networks. The conventional networking way of interconnecting Frame Relay and Ethernet is to carry Ethernet over Frame Relay, so as to provide Local Area Network (LAN) emulation. During the process in which Ethernet gradually evolves into the core of MAN, it is necessary to connect Frame Relay networks to Ethernet, so as to provide Frame Relay emulation.

Figure 1:
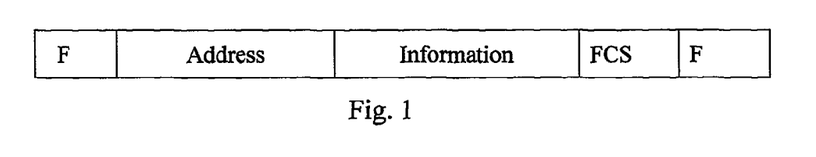
FIG. 1 is a diagram illustrating the frame structure for transmission on the Frame Relay data link layer.

Services carried over Frame Relay generally use Q.922 protocol, i.e., the Frame Relay Link Access Procedure for Frame (LAPF) protocol. The frame structure for transmission over the Frame Relay data link layer is shown in FIG. 1. Each frame includes 4 fields: Flag Sequence, Address, Information, and Frame Check Sequence (FCS).

The Flag Sequence (F) field is a special 8-bit octet 01111110. Since the length of a Frame Relay frame is variable, this field is used to indicate the beginning and end of a frame. In a received frame, other fields are not allowed to contain content same as that of the Flag Sequence field. Therefore, zero padding is usually used at the transmitting side to prevent 01111110 from occurring in other fields. Inverse processing is performed at the receiving side, i.e., removing the zero bits padded.

The Information field includes user data, the length of which has to be an integer number of bytes, with the maximum default length being 262 bytes. The length of the Information field which the network determines through negotiation is at least 1600 bytes.

Frame Check Sequence (FCS) is the Frame Check Sequence field.

Figure 2:
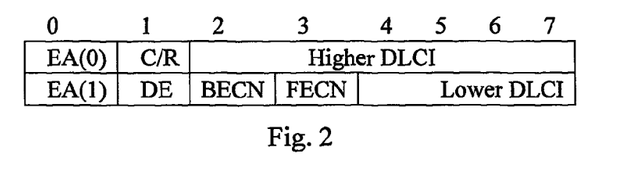
FIG. 2 is a diagram illustrating the 2-byte address field used in the Frame Relay frame shown in FIG. 1.
Figure 3:
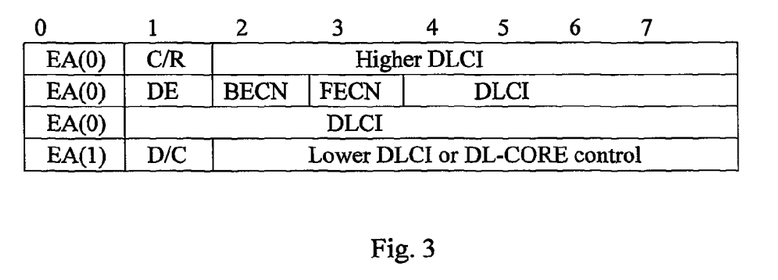
FIG. 3 is a diagram illustrating the 4-byte address field used in the Frame Relay frame shown in FIG. 1.

The Address field may have a length of 2-4 bytes, as shown in FIG. 2 and FIG. 3. As illustrated, the Extended Address (EA) includes extended bits for the Address field, and EA=1 indicates that the current byte is the final byte of the Address field.

The Command/Response (C/R) bit is used to identify whether the frame is a command frame or a response frame.

The Data Link Connection Identifier (DLCI) is used to identify a virtual connection carried over the User to Network Interface (UNI) or Network to Network Interface (NNI). The length is 10 bits by default, and may be extended to 16 or 23 bits with EA.

The Discard Eligibility Identifier (DE) Bit: DE=1 indicates that discarding may be considered when congestion occurs in the network.

Forward Explicit Congestion Notification (FECN) is used to notify the user to initiate a congestion avoidance program. FECN=1 indicates the congestion in a direction same as which the FECN indication frame is carried in.

Backward Explicit Congestion Notification (BECN) is used to notify the user to initiate a congestion avoidance program. BECN=1 indicates the congestion in a direction opposite to which the BECN indication frame is carried in.

Figure 4:
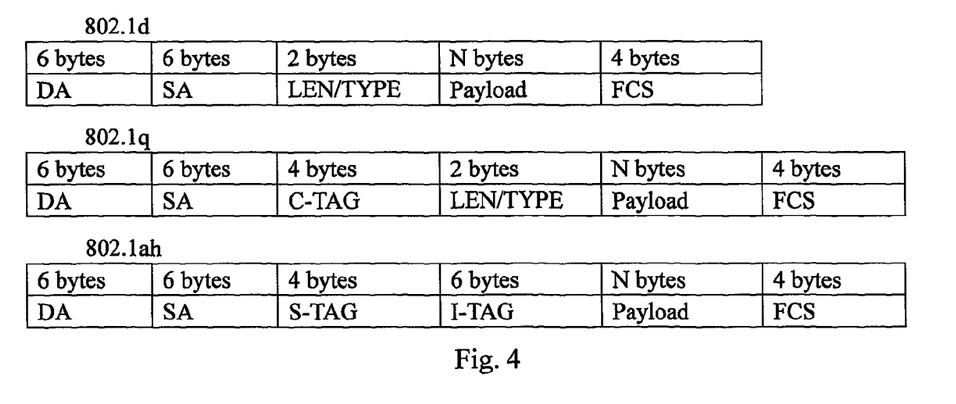
FIG. 4 is a diagram illustrating the IEEE 802.1 Ethernet frame format.

FIG. 4 is a diagram illustrating the format of 802.1 Ethernet frame. It includes Destination Address (DA), Source Address (SA), frame Length (LEN), Payload TYPE (TYPE), Frame Check Sequence (FCS), Ethernet Customer bridge network TAG (C-TAG), metropolitan Ethernet Service instance TAG (S-TAG), and backbone Ethernet service Instance TAG (I-TAG). For specific descriptions about each of the fields, please refer to the IEEE 802.1d, IEEE 802.1q, and IEEE 802.1ah protocol documents.

As shown in FIG. 4, in the 4-byte C-TAG, there are a 2-byte Protocol Type ID (TPID) and a 2-byte virtual local area network Tag Control Information (TCI). In the 6-byte I-TAG, there are a 2-byte TPDI and a 3-byte backbone Ethernet service Instance Service Identifier (I-SID).

PWE 3 working group of the IETF standardization organization is dedicated to researches on various end-to-end pseudo wire emulations over Packet Switched Network (PSN). The emulated services may be transmitted by means of Frame Relay, Ethernet, ATM, TDM dedicated lines. PWE3 uses the tunnel mechanism on PSN to emulate the basic properties of a certain service. The tunnel is referred to as Pseudo Wire (PW) here. PWE3 encapsulates the Protocol Data Unit (PDU) for a certain service, where the PDU contains data and control information needed by certain services. With the PWE3 mechanism, operators may transfer all transportation services into a converged network (such as IP/MPLS).

Figure 5A:
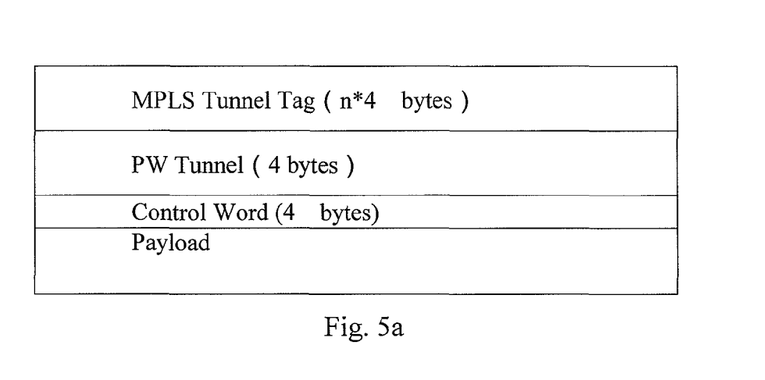
FIG. 5a is the encapsulation format of Frame Relay over MPLS.
Figure 5B:
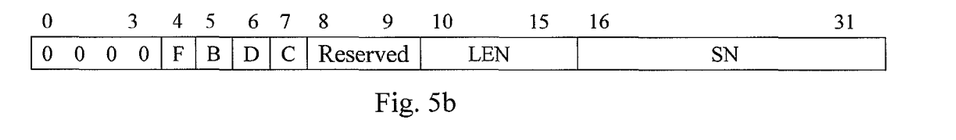
Figure 5C:
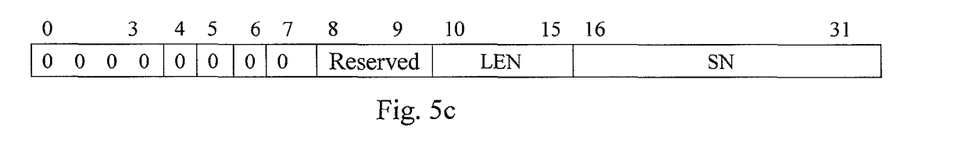
Figure 6:
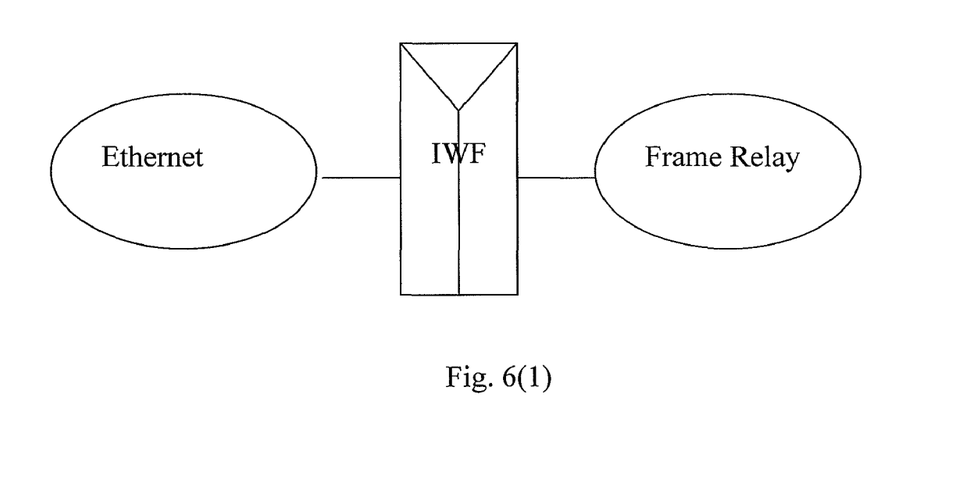

A general PWE3 encapsulation typically includes four parts: the header for the Packet Switch Network (PSN), the Pseudo Wire Identifier, the Control Word and the PDU. FIG. 5a shows the encapsulation format for Frame Relay over Multi-Protocol Log Switch (MPLS). FIG. 5b and FIG. 5c show the control word formats for one-to-one mapping and multiple-to-one mapping, respectively. For a different mapping, the control word and the payload may vary. As shown in FIG. 5b, for one-to-one mapping, one pseudo wire carries only one virtual circuit. Accordingly, the DLCI in the address field, which is valid only in the local Frame Relay circuit, becomes invalid when a re-encapsulation is performed at the peer side. Therefore, the payload uses only the information field of the encapsulated Frame Relay, and it is not necessary to encapsulate the address field. F, B, D, and C are obtained by coping directly from the BECN, FECN, DE and C/R in the address field of the Frame Relay. As shown in FIG. 5c, for multiple-to-one mapping, one pseudo wire may carry a plurality of Frame Relay virtual circuits, thus the payload includes the information field and address field of the Frame Relay frame. LEN and SN represent the length and the sequence number for the packet, respectively. Furthermore, since the maximum packet length may be up to 65535 bytes, it is not necessary to divide the Frame Relay frame.

The PWE3 encapsulation of the PWE3 working group has a disadvantage in that its object is limited to IP or MPLS based Packet Switch Networks.

Furthermore, there are two kinds of interworking between different kinds of networks: network interworking and service interworking. In network interworking, two terminals use the same protocol, but different protocols are used between networks, and the existence of the network at the central position is transparent to the users at both ends. In service interworking, different protocols may be used by different terminals, and a peer-to-peer communication is performed between them.

A related art discloses a service interworking between Ethernet and Frame Relay networks, and the corresponding network model is shown in FIG. 6(1) and FIG. 6(2). This interworking is based on upper layer protocols. The network model for service interworking between the Ethernet and Frame Relay networks is shown in FIG. 6(1) and FIG. 6(2). This interworking technique is based on upper layer protocols. For example, if the upper protocol carried over the Frame Relay network is IP protocol, an Interworking Function (IWF) in a direction from Ethernet to Frame Relay separates an IP message from a Frame Relay frame, and encapsulates it into an Ethernet frame; an IWF in a direction from Frame Relay to Ethernet separates the IP message from the Ethernet frame and encapsulates it into a Frame Relay frame. But this technique has a disadvantage in that the final implementation depends on conversions between messages for different layers in the Open System Interconnection (OSI) reference model since the interconnection of two networks is implemented on the basis of service interworking. In other words, in order to separate/encapsulate upper layer protocol messages from/into Frame Relay or Ethernet frames, it is necessary for the interworking function to have knowledge of the frame format of L2 Frame Relay and Ethernet frames, as well as the type of upper protocols, which leads to very complicated implementations.

SUMMARY

To enable emulation of Frame Relay over metropolitan Ethernet and to solve the disadvantages as described above in the related art, one object of the invention is to provide a simple method for carrying Frame Relay over Ethernet.

To fulfill the above object, the invention is embodied in the following solutions.

A method for carrying Frame Relay over Ethernet includes:

Step 1: encapsulating a Frame Relay data frame with frame header and tail flag sequences having been removed into an Ethernet frame, and transmitting the Ethernet frame over Ethernet; and Step 2: receiving the Ethernet frame, removing the Ethernet frame header, reconstructing the Frame Relay frame, adding flag sequences to the Frame Relay frame, and transmitting the Frame Relay frame to a destination Frame Relay network.

The step of encapsulating a Frame Relay data frame with frame header and tail flag sequences having been removed into an Ethernet frame includes:

1) determining a control word and performing payload encapsulation;

2) mapping a DLCI to a VCE ID, and encapsulating the VCE ID; and 3) encapsulating the Ethernet frame header, generating the Ethernet FCS.

The steps of reconstructing the Frame Relay data frame and adding flag sequences to the Frame Relay frame include:

4) removing the VCE ID, and mapping it to the DLCI;

5) obtaining the control word, obtaining Frame Relay information from the payload and reconstructing the Frame Relay frame according to the control word; and 6) adding flag sequences to the Frame Relay frame, and transmitting the Frame Relay frame to the Frame Relay network.

The method further includes removing the Frame Relay FCS;

The method further includes regenerating the Frame Relay FCS;

The method further includes mapping the FECN, BECN and DE in the address field of the Frame Relay frame to user priorities in the Ethernet frame, and responding to the FECN, BECN and DE.

The method further includes responding to the FECN, BECN and DE in the address field of the Frame Relay frame.

The mapping includes multiple-to-one mapping and one-to-one mapping. For multiple-to-one mapping, the payload encapsulation includes an information field and a complete address field of the Frame Relay frame, and for one-to-one mapping, the payload encapsulation includes an information field and an address field of the Frame Relay frame, where the address field may not include DLCI.

The control word includes FRG, LEN, SN, and M.

The method further includes: when the Frame Relay frame is fragmented with one Ethernet frame being lost, discarding other Ethernet frames associated with the Frame Relay frame.

The method further includes re-ordering an out-of-order frame with the FRG and SN in the control word.

For an Ethernet frame with VLAN tag field, the DLCI values of different fragments are mapped to different user priorities, so as to realize the classified QoS mechanisms for user services. For an Ethernet frame without VLAN tag field, the QoS mechanism provided by the network may be employed.

The Ethernet frame may be an Ethernet frame of 802.1d or 802.1q format, where the Interworking Word field includes a 2-byte Payload Type field at the end of the Ethernet frame header and a 4-byte IW ID field at the beginning of the Ethernet frame payload portion.

The Ethernet frame may be an Ethernet frame of 802.1ah format, where the Interworking Word is a backbone Ethernet service Instance TAG (I-TAG) and the IW ID is a backbone Ethernet service Service Instance Identifier (I-SID) in the I-TAG.

The invention is advantageous in that the PWE3 pseudo wire mechanism is used in the invention, which is independent of the types of upper layer protocols. At the to-MEN IWF, a data frame received from a Frame Relay network is directly encapsulated into an Ethernet frame, and transmitted over a metropolitan Ethernet. At the to-FR IWF, the header of the received Ethernet frame is removed, and the original Frame Relay data frame is reconstructed and transmitted to the destination Frame Relay network according different DLCIs. Carrying of Frame Relay over Ethernet is thus implemented.

BRIEF DESCRIPTION OF THE DRAWINGS

FIG. 5b is the control word format for the one-to-one mapping used in the encapsulation format shown in FIG. 5a;

FIG. 5c is the control word format for the multiple-to-one mapping used in the encapsulation format shown in FIG. 5a;

FIG. 6(1) and FIG. 6(2) illustrate the network models for the conventional service interworking between Ethernet and Frame Relay networks;

FIG. 9(1)-FIG. 9(4) are diagrams illustrating the structures for encapsulating with 802.1 Ethernet frames.

DETAILED DESCRIPTION

Detailed descriptions will be made below to specific embodiments of the present invention with reference to the accompanying drawings.

In view of the related art, one object of the invention is to perform end-to-end emulation of the Frame Relay over Ethernet. It is based on L2 layer interworking and the pseudo wire mechanism in PWE3 is used, without relying on the type of upper protocols. A data frame received from a Frame Relay network is encapsulated into an Ethernet frame at the Metropolitan Ethernet Network (to-MEN) Interworking Function (IWF), and transmitted over the Metropolitan Ethernet. The Frame Relay (to-FR) Interworking Function (IWF) removes the header of the received Ethernet frame, and reconstructs the original Frame Relay data frame, which is transmitted to a destination Frame Relay network according to different DLCIs. In this manner, Frame Relay carried over Ethernet is achieved. This emulation is performed directly on L2 data link layer, independent of upper protocols, that is, it is completely transparent to the type of upper protocols.

Figure 7:
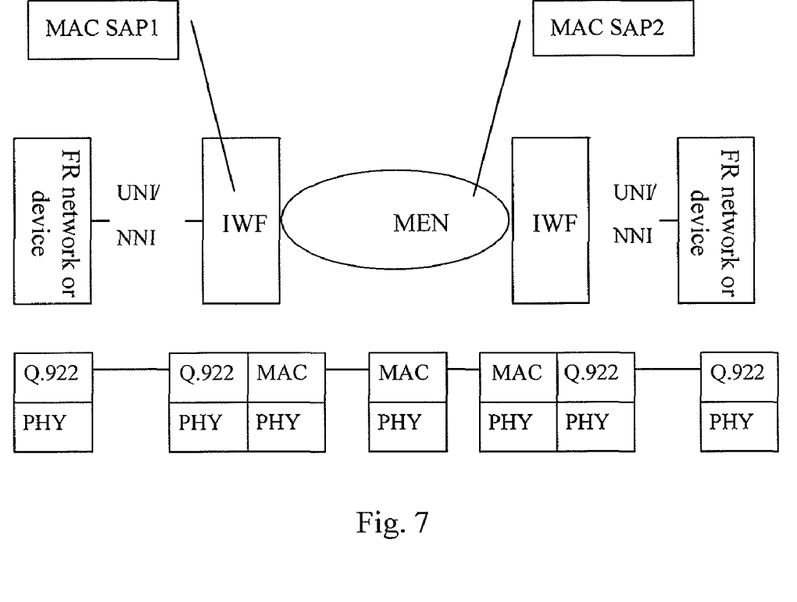
FIG. 7 shows an emulation model for Frame Relay virtual connection in one embodiment of the invention.
Figure 8A:
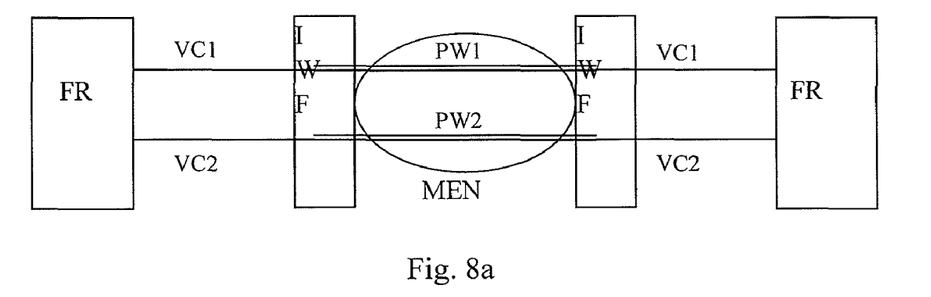
FIG. 8a shows an emulation model for the one-to-one mapping in one embodiment of the invention.
Figure 8B:
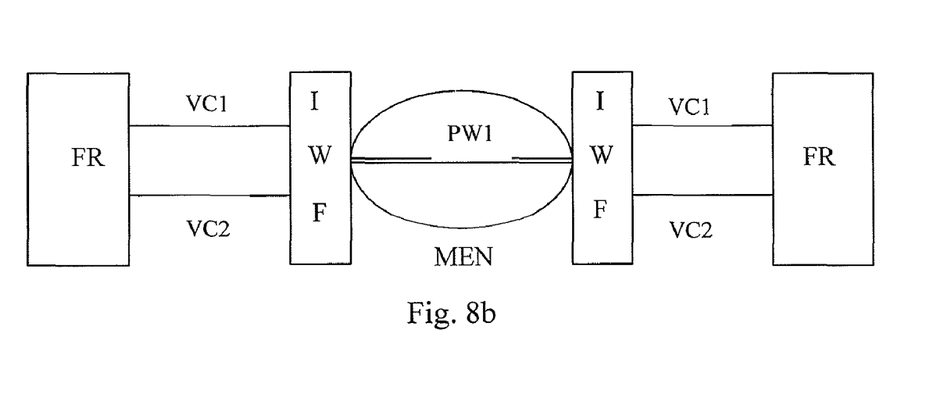
FIG. 8b shows an emulation model for the multiple-to-one mapping in one embodiment of the invention.
Figure 9:
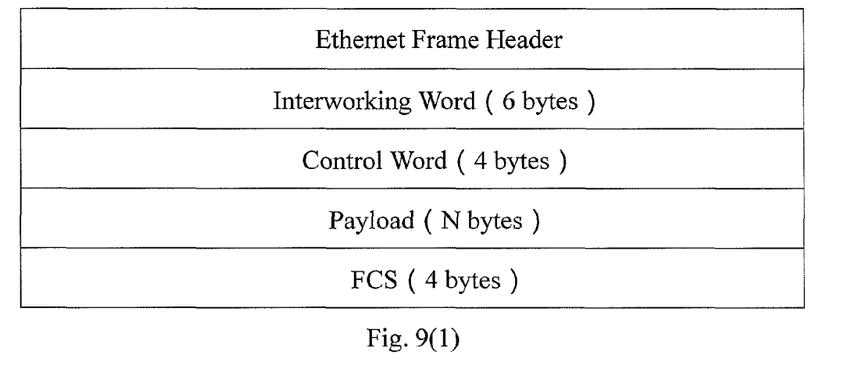

During the process of network interworking, IWF plays a very important role. It connects two networks of different types. The emulation of Frame Relay virtual circuits over Ethernet is referred to as Frame Relay Virtual Connection Emulation Service (VCES), and the network model is shown in FIG. 7. Illustratively, the Metropolitan Ethernet MEN is the central network, and the two IWFs connect the Frame Relay networks/equipments located at the edges and the metropolitan Ethernet located in the central position respectively, in which the Frame Relay connected with the IWF may have an NNI or UNI interface. At the edge of the metropolitan Ethernet, a tunnel is constructed between two media access control service access point (MAC SAPs) MAC SAP1 and MAC SAP2. A pseudo wire, i.e., an emulation of the Ethernet virtual connection, may be provided in the tunnel, so as to establish a mapping from virtual connection (VC) to PW. A Frame Relay VC is mapped to a PW at the IWF at one side, and an inverse mapping is performed at the IWF on the other side to obtain Frame Relay VC from PW. The mapping includes two types: one-to-one mapping and multiple-to-one mapping. For one-to-one mapping (see FIG. 8a), one PW may carry only one VC, which forms a one-to-one mapping; and for a multiple-to-one mapping (see FIG. 8b), multiple VCs may be mapped to one PW.

Since the service is bidirectional, the IWFs at both sides may be distinguished according the traffic direction for simplicity of description. In each direction, there exist a pair of to-MEN IWF and to-FR IWF.

a. A to-MEN IWF. The IWF receives Frame Relay frames, converts them into the format of Ethernet frames, and transmits them to an Ethernet.

b. A to-FR IWF. The IWF receives Ethernet frames, converts them into the format of Frame Relay, and transmits them to a Frame Relay network.

Depending on the specification of the Frame Relay UNI interface and NNI interface, it is possible to consider only the Frame Relay types with 2-byte and 4-byte address fields, and the establishment of the service may be performed through manual configuration or automatic negotiation.

In one embodiment of the invention, the encapsulation formats are similar for different types of Ethernet. For example, FIG. 9(1) to FIG. 9(4) illustrate the structures for encapsulation with 802.1 Ethernet frames.

In the encapsulation structure of the Ethernet frame shown in FIG. 9(1), the header structure of the Ethernet frame in the front end is shown in FIG. 4.

If it is an Ethernet frame of 802.1d format, the header of the Ethernet frame includes DA, SA, and LEN/TYPE.

If it is an Ethernet frame of 802.1q format, the header of the Ethernet frame includes DA, SA, C-TAG, and LEN/TYPE, where TPID and TCI are included in C-TAG.

If it is an Ethernet frame of 802.1ah format, the header of the Ethernet frame includes DA, SA, S-TAG, I-TAG, and LEN/TYPE, where TPID and I-SID are included in I-TAG.

As shown in FIG. 9(1), the interworking word, the control word and the payload information are key information specific to the embodiments of the present invention. They are used in Ethernet to perform emulation with PW, which will be described in more detail below.

The Interworking Word

It includes a Virtual Circuit Emulation ID (VCE ID), which uniquely identifies a PW over the Ethernet Metropolitan Area Network. Two approaches may be employed to determine the interworking word.

In case of 802.1d or 802.1q, one approach may be used to set an interworking word of 6 bytes at the end of the Ethernet frame header, to uniquely identify one PW. The interworking word includes the LEN/TYPE field at the end of the frame header, and the subsequent 4-byte VCE ID. One PW may be formed by two virtual circuits in different directions, and thus one PW may have two different VCE IDs. The configurations of the interworking word for 802.1d or 802.1q are shown in FIG. 9(2) and FIG. 9(3) respectively.

In case of 802.1ah, I-TAG functions as the interworking word in another approach, in which the 3 byte I-SID is used as VCE ID. Therefore, a PW mapping correspondence is established between the virtual connection information for the Frame Relay network and the I-SID in the I-TAG of the 802.1ah Ethernet frame. The details are shown in FIG. 9(4).

As described above, according to the network model shown in the figures according to embodiments of the invention, a tunnel is formed between MAC SAP1 and MAC SAP2 at the edges of the metropolitan Ethernet, due to establishment of a mapping correspondence. The tunnel may be determined with the VCE ID as shown in FIG. 9(2), FIG. 9(3), and FIG. 9(4).

Figure 10:
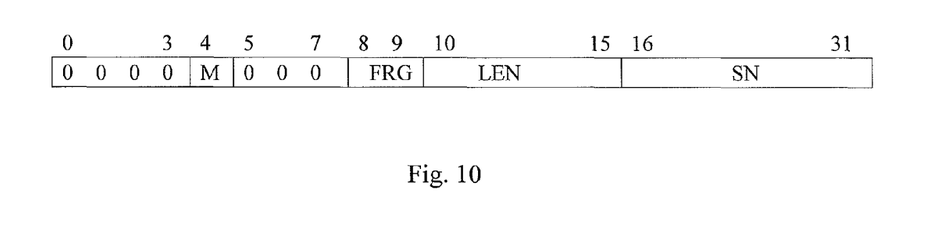
FIG. 10 shows the control word format used in the Ethernet frame encapsulation structure as shown in FIG. 9(1).

FIG. 10 shows the format of the control word used in FIG. 9(1), which includes the following parts.

Fragment (FRG) is 2 bits long, and is used to identify whether a Frame Relay frame is fragmented. Since the length of the Frame Relay frame is invariable and the length of the payload of an Ethernet frame is required to be within 46~1500 bytes, one Frame Relay frame may be divided into a plurality of Ethernet frames. Details of this field are shown in Table 1.

TABLE 1

Meanings of the FRG field

| bit 8 | bit 9 | Description |
|---|---|---|
| 0 | 0 | The Ethernet frame includes a complete Frame Relay frame, that is, the Frame Relay frame is not fragmented or does not support fragmentation. |
| 0 | 1 | The Ethernet frame carries the first packet of the fragmented Frame Relay frame. |
| 1 | 0 | The Ethernet frame carries the last packet of the fragmented Frame Relay frame. |
| 1 | 1 | The Ethernet frame carries an intermediate packet of the fragmented Frame Relay frame. |

Length (LEN) is a 6-bit unsigned number, and represents the size of the padding bits. In Ethernet, it is required that a frame shall be at least 64 bytes in length, i.e., the Ethernet payload shall be at least 46 bytes. If sizeof (CW)+sizeof (payload)<46, padding bits will appear, and LEN=46−sizeof (CW)−sizeof (payload) (CW control word). If sizeof (CW)+ sizeof (payload)>=46, LEN=0.

Sequence Number (SN) is a 2-byte sequence number, for detection of packet missing and out-of-order. The to-FR IWF sorts and reassembles the frames according to the received SNs. For the to-MEN IWF, the SN of the first transmitted Ethernet packet is set to an arbitrary value, and the subsequent SNs are increased one by one according to their transmission orders and take $2^{16}$ as their modulo, i.e., SN=(SN+1)Mod ($2^{16}$). For the to-FR IWF, an expected-SN (an expected Sequence Number) need be maintained. The SN of the first received frame is considered as a correct value by default, and the expected-SN is set to the value of the first received SN. For the following frames, if SN>=expected-SN, expected-SN= (expected-SN−SN+1)Mod($2^{16}$); otherwise, expected-SN keeps unchanged.

Modify (M) is a bit used to indicate whether the payload encapsulation includes the Frame Relay FCS. M=1 means that the payload includes the FCS, and M=0 means that the Frame Relay FCS was removed during encapsulation, and should be regenerated when the Frame Relay is reconstructed. When the maximum length of the Frame Relay frame automatically negotiated in the network meets the length requirement for the Ethernet frame, it is not necessary for the to-MEN IWF to fragment the Frame Relay frame, and the flag bit is set to 0. If the maximum length of the Frame Relay frame after network negotiation is greater than the length requirement of Ethernet frame, the to-MEN IWF may perform the processing depending on whether fragmentation is necessary. The to-MEN IWF should support M=0, and M=1 is optional. The to-FR IWF determines whether the Frame Relay FCS should be regenerated based on the M flag in the control word.

Payload: The payload encapsulated in the Ethernet frame includes the address, the Frame Relay payload, and the FCS (optional) fields.

Descriptions will be made below to the processing at the IWF, that is, the method for carrying Frame Relay over Ethernet according to embodiments of the invention. The method includes steps for the to-MEN IWF to process Frame Relay frames, and steps for the to-FR IWF to process Ethernet frames.

The to-MEN IWF processes frames received from a Frame Relay network according the following steps.

1) Receiving a Frame Relay frame, removing header and tail flag sequences and FCS from the Frame Relay frame.

In this step, removing FCS is optional. In other words, FCS may be removed, or may be kept.

2) Performing appropriate processing on the FECH, BECN, and DE in the address field.

This step is optional. After step (1), the to-MEN IWF may obtain the address field, i.e., it may determine whether to map the FECN, BECN, DE, and DCLI to appropriate user priorities. If the to-MEN IWF has its own ability, it may notify upper layers according the FECN, BECN and DE to deal with the congestion. These two actions are both optional. For example, if DE=1, it means that the frame may be discarded when congestion occurs.

Here, the processing includes not only mapping to user priorities, but also the response of the to-MEN IWF to the three indications.

3) Determining the FRG, LEN, SN, and M in the control word; and performing payload encapsulation;

4) Mapping a DLCI to a VCE ID, encapsulating the VCE ID; and

5) Encapsulating a header for the Ethernet frame, generating an Ethernet FCS, and transmitting the Ethernet frame to Ethernet.

The to-FR IWF performs processing on the frames received from Ethernet according to the following procedure:

1) Receiving an Ethernet frame, checking the Ethernet FCS, and removing the Ethernet frame header;

2) Removing the VCE ID, and mapping it to the DLCI;

3) Obtain the control word, and obtaining Frame Relay information from the payload, and performs packet re-ordering and frame reconstruction according the control word;

4) Performing appropriate processing on the FCN, BECN, and DE in the address field.

If the to-FR IWF has its own ability, it may notify upper layers to process the congestion according the FECN, BECN, and DE. The processing includes only the response of the to-FR IWF to the three indications, and does not include mapping. This step is optional.

5) Regenerating the Frame Relay FCS, adding flag sequences, and transmitting the frame to the Frame Relay network.

Regenerating Frame Relay FCS in this step is optional, corresponding to the processing of the to-MEN IWF. If the Frame Relay FCS has been removed during encapsulation, the Frame Relay FCS needs to be regenerated when the Frame Relay is reconstructed.

The mapping includes multiple-to-one mapping and one-to-one mapping. In one-to-one mapping, one pseudo wire carries only one Frame Relay virtual circuit, and the DLCI, which is valid only in the local Frame Relay circuit, becomes invalid when a re-encapsulation is performed at the peer side. Therefore, payload encapsulation only involves encapsulating BECN, FECN, DE, C/R in the address field of the Frame Relay frame into the Ethernet payload, and DLCI is not included. In multiple-to-one mapping, one pseudo wire may carry multiple Frame Relay circuits, and therefore, the information field and the complete address field of the Frame Relay frame shall be included in the payload encapsulation.

One embodiment of the invention relates to processing on frame out-of-order and missing, congestion, and QoS.

1) Out-of-Order

Out-of-order means that the SN in the Ethernet frame received by the to-FR IWF does not match the expected-SN.

The to-FR IWF shall re-order the out-of-order frames by using the FRG and SN in the control word. If a frame can not be re-ordered, it is discarded.

2) Frame Missing

Frame missing means that a frame actually does not arrive or is discarded for some reason, including the following situations:

a) a frame does not arrive at the to-FR IWF;

b) a frame is discarded because it can not be re-ordered;

c) a frame is discarded because of an erroneous connection, where the erroneous connection means that the VCE ID and DLCI in the frame can not be retrieved in the inverse mapping table stored at the to-FR IWF; and d) a frame is discarded because of a FCS checking error.

Because there is no retransmission mechanism, if one Ethernet frame is missing after the Frame Relay frame is fragmented, the other Ethernet frames associated with the Frame Relay frame will be discarded.

Data are transmitted in a simplified manner on the second layer of OSI via Frame Relay. Erroneous frames are discarded directly, and error correction and flow control are handed over to the upper layers. Therefore, the to-FR IWF may process the missing frames according to the Ethernet OAM requirements, i.e., notifying the upper layer network when the missing frames amount to a certain percentage.

3) Congestion Management

For an Ethernet frame of 802.1Q, a 3-bit user priority is included in the VLAN tag field, in which 0~7 different priorities may be set, to provide different levels of services to different types of services. After a data frame is assigned a priority, the frame may be put in the transmission queue, to control the transmission of the frame and the network transmission delay.

For example, if the FECN in the Frame Relay frame received by the to-MEN IWF is set to 1, the IWF may map the FECN to a certain value of user priority, so as to realize forward congestion notification. The backward explicit congestion notification (BECN) and the Discard Eligibility Identifier (DE) may be similarly mapped to a certain value of user priority, to notify the network node to take appropriate actions. For example, the to-MEN IWF maps the DE to a certain user priority, to notify the network node to appropriately discard some frames when the network is in congestion.

4) Quality of Service (QoS)

There is no field representing service priority in the Frame Relay frame format, that is, priorities of data link connections are not distinguished in the Frame Relay protocol itself But the network operators usually specify different importance for different data link connection identifiers (DLCI) in the equipments. The left column in table 2 is a DLCI division of different importance recommended in the ITU-T Q.922.

There are three different ways to define the service levels of Ethernet frames: all the frames belong to one service level; service levels are distinguished based on user priorities; and service levels are distinguished based on DSCP. When user priorities are applied in QoS, each port of a 802.1p-enabled equipment may support a 2, 4, or 8-priority queue, and the QoS mechanism may be implemented using algorithms such as strict priority and weighting polling. For an Ethernet frame of this type, DCLI values assigned different importance are corresponded by the network operators to user priorities. Table 2 provides a correspondence method:

TABLE 2

Mapping from DLCI value to Ethernet user priority

| DLCI value and its meaning | User priority |
|---|---|
| 0 (intra-channel signaling) | 7 |
| 1023 (inter-channel layer management) | 6 |
| 16~991 (PVC and SVC calling) | 5 |
| 992~1007 (load service management in the second layer) | 0 |

(Note:
DLCI 1~15 and 1008~1022 are reserved)

An Ethernet frame without VLAN tag field depends on the actual QoS mechanism provided by the network. For example, it is corresponded to the DLCI belonging to a different fragment, for example, by using the DSCP field in the upper layer IP protocol.

In summary, the pseudo wire mechanism of PWE3 is used in the invention without relying on the types of upper layer protocols. At the to-MEN IWF, a data frame from a Frame Relay network is directly encapsulated into an Ethernet frame, and transmitted over a metropolitan Ethernet; at the to-FR IWF, the header of the received Ethernet frame is removed, the original Frame Relay data frame is reconstructed, and transmitted to the destination Frame Relay network according different DLCIs. In this manner Frame Relay is carried over Ethernet.

The specific embodiments are just illustrative of, rather than limiting the invention.

What is claimed is:

1. A method for carrying Frame Relay over Ethernet, comprising the steps of:

encapsulating a Frame Relay frame with frame header and tail flag sequences having been removed into an Ethernet frame, and transmitting the Ethernet frame over Ethernet; and receiving the Ethernet frame, removing a header from the Ethernet frame, reconstructing the Frame Relay frame, adding flag sequences to the Frame Relay frame, and transmitting the Frame Relay frame to a destination Frame Relay network;

wherein the step of encapsulating the Frame Relay frame with frame header and tail flag sequences having been removed into an Ethernet frame comprises:

determining a control word and performing payload encapsulation;

mapping a Data Link Connection Identifier (DLCI) to a Virtual network Connection Identifier (VCE ID), and encapsulating the VCE ID; and encapsulating a header for the Ethernet frame, generating an Ethernet Frame Check Sequence (FCS) and adding the FCS into the Ethernet frame.

2. The method according to claim 1, wherein the steps of reconstructing the Frame Relay frame and adding flag sequences to the Frame Relay frame comprise:

removing the VCE ID, and mapping it to the DLCI;

obtaining the control word, obtaining Frame Relay information from the payload and reconstructing the Frame Relay frame according to the control word; and adding flag sequences to the Frame Relay frame, and transmitting the Frame Relay frame to the Frame Relay network.

3. The method according to claim 1, further comprising the step of:

removing the FCS from the Frame Relay frame.

4. The method according to claim 3, further comprising the step of:

regenerating the FCS for the Frame Relay frame.

5. The method according to claim 1, further comprising the steps of:

mapping a Forward Explicit Congestion Notification (FECN), a Backward Explicit Congestion Notification (BECN), and a Discard Eligibility Identifier (DE) in the address field of the Frame Relay frame to user priorities in the Ethernet frame, and responding to the FECN, BECN and DE;

wherein the step of responding to the FECN, BECN and DE comprises: notifying an upper layer to process a congestion according the FECN, BECN, and DE.

6. The method according to claim 5, further comprising the step of:

responding to the FECN, BECN and DE in the address field of the Frame Relay frame.

7. The method according to claim 1, wherein the mapping comprises multiple-to-one mapping and one-to-one mapping;

for multiple-to-one mapping, the payload encapsulation comprises an information field and a complete address field of the Frame Relay frame; and for one-to-one mapping, the payload encapsulation comprises an information field and an address field of the Frame Relay frame.

8. The method according to claim 1, wherein the control word comprises Fragment (FRG), Length (LEN), Sequence Number (SN), and Modification (M).

9. The method according to claim 8, further comprising:

re-ordering out-of-order frames with the FRG and SN in the control word.

10. The method according to claim 8, further comprising:

if the Frame Relay frame is fragmented, when one fragmented Ethernet frame being lost, discarding other fragmented Ethernet frames associated with the fragmented Frame Relay frame according to the FRG of the Control Word.

11. The method according to claim 2, further comprising:

for an Ethernet frame with a Virtual Local Area Network (VLAN) tag field including user priorities, mapping different DLCI values to different user priorities; and for an Ethernet frame without a VLAN tag field, employing a Quality of Service (QoS) mechanism provided by the network.

12. The method according to claim 1, wherein the Ethernet frame is an Ethernet frame of 802.1d or 802.1q format; and wherein the Interworking Word field comprises a Payload Type field at the end of the Ethernet frame header and a 4-VCE ID field at the beginning of the Ethernet frame payload portion.

13. The method according to claim 1, wherein the Ethernet frame is an Ethernet frame of 802.1ah format, and wherein the Interworking Word is a backbone Ethernet service Instance TAG (I-TAG) and a VCE ID of the I-TAG is a backbone Ethernet I-service Service Instance Identifier (I-SID) in the I-TAG.

14. The method according to claim 2, wherein the mapping comprises multiple-to-one mapping and one-to-one mapping;

for multiple-to-one mapping, the payload encapsulation comprises an information field and a complete address field of the Frame Relay frame; and for one-to-one mapping, the payload encapsulation comprises an information field and an address field of the Frame Relay frame.

15. The method according to claim 2, wherein the control word comprises FRG, LEN, SN, and M.

* * * * *